United States Patent
Liu et al.

(10) Patent No.: US 12,425,170 B2
(45) Date of Patent: Sep. 23, 2025

(54) SYSTEMS AND METHODS FOR PROVIDING FEEDBACK INFORMATION

(71) Applicant: ZTE Corporation, Guangdong (CN)

(72) Inventors: Xing Liu, Shenzhen (CN); Peng Hao, Shenzhen (CN); Xingguang Wei, Shenzhen (CN); Jing Shi, Shenzhen (CN)

(73) Assignee: ZTE Corporation, Shenzhen (CN)

(*) Notice: Subject to any disclaimer, the term of this patent is extended or adjusted under 35 U.S.C. 154(b) by 455 days.

(21) Appl. No.: 18/098,341

(22) Filed: Jan. 18, 2023

(65) Prior Publication Data
US 2023/0155790 A1    May 18, 2023

Related U.S. Application Data

(63) Continuation of application No. PCT/CN2020/107944, filed on Aug. 7, 2020.

(51) Int. Cl.
*H04L 5/00* (2006.01)
*H04W 72/232* (2023.01)

(52) U.S. Cl.
CPC ......... *H04L 5/0055* (2013.01); *H04W 72/232* (2023.01)

(58) Field of Classification Search
CPC ... H04L 5/0055; H04L 1/1861; H04L 1/1896; H04L 5/0053; H04L 5/0094; H04W 72/232; H04W 72/23
See application file for complete search history.

(56) References Cited

U.S. PATENT DOCUMENTS

2020/0374040 A1* 11/2020 Lou .............. H04L 5/0055
2021/0226740 A1*  7/2021 Lei .............. H04L 1/1864

FOREIGN PATENT DOCUMENTS

| CN | 109639398 A | 4/2019 |
| CN | 110086583 A | 8/2019 |
| CN | 110149717 A | 8/2019 |
| CN | 111277388 A | 6/2020 |
| IN | 202037025163 A | 7/2020 |

(Continued)

OTHER PUBLICATIONS

Extended European Search Report on EP Appl No. 20948185.2, dated Jul. 3, 2023 (5 pages).

(Continued)

*Primary Examiner* — Kiet Tang
(74) *Attorney, Agent, or Firm* — Foley & Lardner LLP

(57) ABSTRACT

In various arrangements, a User Equipment (UE) receives at least one of first scheduling indicators and second scheduling indicators. Each of the first scheduling indicators schedules a transmission. The transmission scheduled by each of the first scheduling indicators is a first transmission type or a second transmission type. Each of the second scheduling indicators schedules two or more of the transmissions. Each transmission scheduled by a second scheduling indicator is the first transmission type or the second transmission type. The UE generates one or more sub-codebooks according to one or more of the first scheduling indicators, the second scheduling indicators, the first transmission type, and the second transmission type. The UE generates a codebook by combining the generated one or more sub-codebooks.

20 Claims, 6 Drawing Sheets

(56) References Cited

FOREIGN PATENT DOCUMENTS

WO    WO-2020/134725 A1    7/2020

OTHER PUBLICATIONS

ZTE Corporation, et al., "Remaining issues on scheduling and HARQ for NR-U", 3GPP TSG RAN WG1 Meeting #99, R1-1911824, Revo, USA, Nov. 9, 2019 (11 pages).
3GPP: "Physical layer procedures for control (Release 16)" Technical Specification Group Radio Access Network; NR;3GPP TS 38.213 V16.2.0; Jun. 2020; Valbonne, France (176 pages).
International Search Report and Written Opinion for PCT Appl. No. PCT/CN2020/107944, mailed Apr. 27, 2021 (9 pages).
First Office Action for CN Appl. No. 202080104701.3, dated Apr. 3, 2024 (with English translation, 47 pages).
ZTE et al., "Discussion on scheduling and HARQ for NR-U", 3GPP TSG RAN WG1 Meeting #98bis, R1-1909976, Oct. 18, 2019, Chongqing, China (7 pages).

\* cited by examiner

| Sub-Codebook | Description | Number of Bits in Sub-Codebook Corresponding to Each DAI Count |
|---|---|---|
| Sub-Codebook 1 | CBG + type 2 DCI | 2*N |
| Sub-Codebook 2 | TB + type 2 DCI | 2 |
| Sub-Codebook 3 | CBG + type 1 DCI | N |
| Sub-Codebook 4 | TB + type 1 DCI | 1 |

FIG. 4

| Sub-Codebook | Description | Number of Bits in Sub-Codebook Corresponding to Each DAI Count |
|---|---|---|
| Sub-Codebook 1 | CBG + type 2 DCI | 2*N |
| Sub-Codebook 2 | TB + type 2 DCI | 2 |
| Sub-Codebook 3 | CBG + type 1 DCI | N |
| Sub-Codebook 4 | TB + type 1 DCI | 1 |
| Sub-Codebook 5 | CBG + TB + type 2 DCI | N+1 |

FIG. 5

SYSTEMS AND METHODS FOR PROVIDING FEEDBACK INFORMATION

CROSS-REFERENCE TO RELATED APPLICATION

This application claims the benefit of priority under 35 U.S.C. § 120 as a continuation of PCT Patent Application No. PCT/CN2020/107944, filed on Aug. 7, 2020, the disclosure of which is incorporated herein by reference in its entirety.

TECHNICAL FIELD

The present disclosure relates to the field of telecommunications, and in particular, to generating a codebook in providing feedback information.

BACKGROUND

Downlink (DL) data scheduling features of New Radio (NR) Radio Access Technology (RAT) systems may include scheduling more than one DL data resource (e.g., more than one Physical Downlink Shared Channel (PDSCH)) by one DL control resource (e.g., a single Physical DL Control Channel (PDCCH)).

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, a wireless communication method includes receiving, by a wireless communication device from a base station, at least one of (1) first scheduling indicators and (2) second scheduling indicators. Each of the first scheduling indicators schedules a transmission. Each of the second scheduling indicators schedules two or more of the transmissions. The wireless communication device generates at least one of a first sub-codebook and a second sub-codebook. The first sub-codebook comprising one or more first feedback bits indicative of reception status of the transmissions scheduled by each of the first scheduling indicators. The second sub-codebook comprising second feedback bits indicative of reception status of the transmissions scheduled by each of the second scheduling indicators. The wireless communication device generates a codebook by combining the first sub-codebook and the second sub-codebook.

In some arrangements, a wireless communication method includes transmitting, by a base station to a wireless communication device, at least one of (1) first scheduling indicators and (2) second scheduling indicators. Each of the first scheduling indicators schedules a transmission. Each of the second scheduling indicators schedules two or more of the transmissions. The base station receives from the wireless communication device, a codebook generated based on at least one of a first sub-codebook and a second sub-codebook. The first sub-codebook comprising first feedback bits indicative of reception status of the transmission scheduled by each of the first scheduling indicators. The second sub-codebook comprising second feedback bits indicative of reception status of the transmissions scheduled by each of the second scheduling indicators. The base station determines, based on the codebook, the reception status of the transmission scheduled by each of the first scheduling indicators and the reception status of the transmissions scheduled by each of the second scheduling indicators.

In some arrangements, a wireless communication method includes receiving, by a wireless communication device from a base station, at least one of (1) first scheduling indicators and (2) second scheduling indicators. Each of the first scheduling indicators schedules a transmission. The transmission scheduled by each of the first scheduling indicators is a first transmission type or a second transmission type. Each of the second scheduling indicators schedules two or more of the transmissions. Each of the two or more of the transmissions scheduled by each of the second scheduling indicators is the first transmission type or the second transmission type. The wireless communication device generates one or more sub-codebooks according to one or more of the first scheduling indicators, the second scheduling indicators, the first transmission type, and the second transmission type. The wireless communication device generates a codebook by combining the generated one or more sub-codebooks.

In some arrangements, a wireless communication method includes transmitting, by a base station to a wireless communication device, at least one of (1) first scheduling indicators and (2) second scheduling indicators. Each of the first scheduling indicators schedules a transmission. The transmission scheduled by each of the first scheduling indicators is a first transmission type or a second transmission type. Each of the second scheduling indicators schedules two or more of the transmissions. Each of the two or more of the transmissions scheduled by each of the second scheduling indicators is the first transmission type or the second transmission type. The base station receives from the wireless communication device, a codebook generated based on one or more sub-codebooks generated by the wireless communication device according to the first scheduling indicators, the second scheduling indicators, the first transmission type, and the second transmission type. The base station determines, based on the codebook, the reception status of the transmission scheduled by each of the first scheduling indicators and the reception status of the transmissions scheduled by each of the second scheduling indicators.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 4 is a table illustrating a number of feedback bits corresponding to each DAI count for different sub-codebooks, according to various arrangements of the present disclosure.

FIG. 5 is a table illustrating a number of feedback bits corresponding to each DAI count for different sub-codebooks, according to various arrangements of the present disclosure.

DETAILED DESCRIPTION OF EXAMPLE EMBODIMENTS

Figure 1:
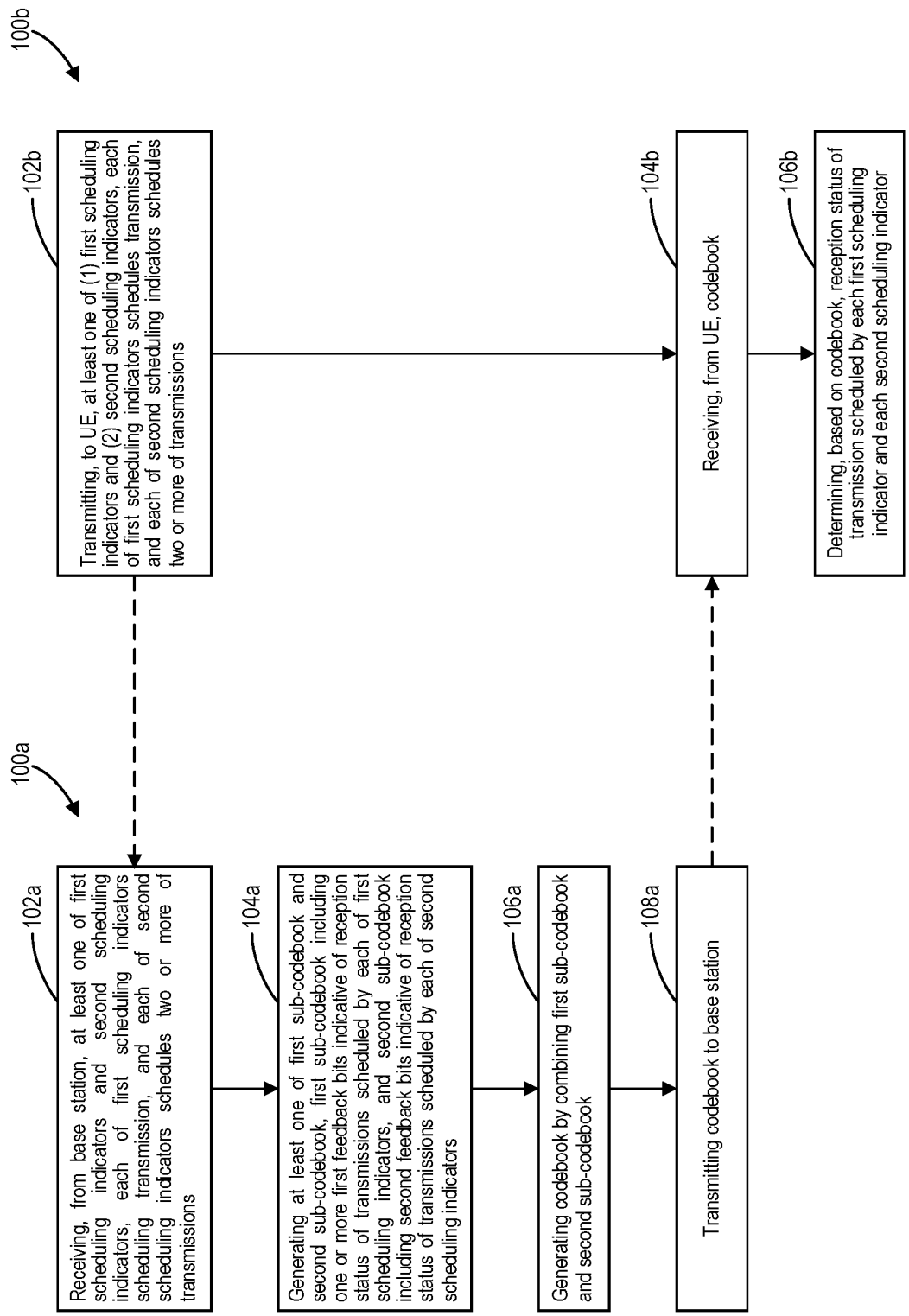
FIG. 1 is a flow chart diagram illustrating an example method for managing feedback, according to various arrangements of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In some conventional wireless communication systems, a base station can use Downlink Control Information (DCI) of a PDCCH to schedule a single PDSCH. Each PDSCH can be used by the base station to transmit at least one (e.g., one or two) Transmission Block (TB) or multiple Code Block Groups (CBGs). A User Equipment (UE) (e.g., a terminal) can provide feedback (e.g., feedback bits) for reception status of the at least one TB or CBGs. For multiple feedback bits of the UE that correspond to the same Uplink (UL) slot, the UE aggregates the multiple feedback bits into a feedback codebook and transmits the feedback codebook to the base station in the UL slot, e.g., on a UL feedback resource such as but not limited to, a Physical UL Control Channel (PUCCH) a Physical UL Shared Channel (PUSCH), or so on. The UE can conventionally generate two types of feedback codebook, a semi-static codebook and a dynamic codebook.

In generating a semi-static codebook, for DL transmission resource corresponding to (mapped to or associated with) a UL feedback resource, the feedback information is generated regardless of whether the base station has scheduled transmission on the DL transmission resource. Thus, in generating a semi-static codebook, misalignment can be avoided between the UE and the base station on "feedback codebook size" and "mapping relationship between the feedback bit and the downlink transmission." Feedback bits in semi-static feedback codebooks may be wasted because in this codebook generation mode, some feedback bits corresponding to some DL transmission resources are useless because those DL transmission resources are not scheduled for DL transmission for the UE.

In generating a dynamic codebook, a Downlink Assignment Index (DAI) field is introduced into the scheduling DCI. The DCI is carried on PDCCH and used for scheduling a DL or UL transmission. In some examples, DAI includes a Counting DAI (e.g., a Counter DAI (C-DAI)) and a Total DAI (T-DAI). The C-DAI indicates the index of a PDSCH that needs feedback in the same feedback codebook up to the current DCI. The position of the feedback bit corresponding to the DL transmission scheduled by the DCI in the feedback codebook can be determined according to the C-DAI. The T-DAI represents the total number of PDSCHs that need to be fed back in the same feedback codebook up to the current PDCCH monitoring time, which can be defined by a current Monitoring Occasion (MO). In a non-carrier aggregation mode, only the C-DAI domain or field can be included in the DCI. Every bit in a dynamic feedback codebook corresponds to an actual scheduled DL data by counting the DL data on the same UL feedback resource, thus effectively saving the feedback overhead. However, the introduction of DAI indication domain also increases the overhead of DCI.

In conventional wireless communication systems, a DCI carried on a PDCCH can only schedule one PDSCH. The PDSCH and DCI can be located in the same carrier (also known as Component Carrier (CC) or cell) in self-scheduling. The PDSCH and DCI can also be located on different carriers in cross-carrier scheduling.

The conventional dynamic codebook generation and feedback methods are briefly described below for context. Three DCIs (DCI1~3) are contained in first MO (e.g., MO1, begin at the starting point of slot n), and two DCIs (DCI4,5) are contained in a second MO (e.g., MO2, begin at the starting point of slot n+1). Feedback information for the PDSCH scheduled by these DCIs is provided in slot n+7 according to feedback timing indicated in the DCIs. The UE multiplexes the feedback information into a feedback codebook. Specifically, DCI1 is located on CC3, and the scheduled PDSCH is located in slot n+4 on CC3. DCI2 is located on CC4, and the scheduled PDSCH is located in slot n+3 on CC4. DCI3 is located on CC5, and the scheduled PDSCH is located in slot n+3 on CC2. DCI4 is located on CC3, and the scheduled PDSCH is located in slot n+5 on CC3. DCI5 is on CC5, and the scheduled PDSCH is in slot n+4 on CC2.

The C-DAIs within the DCIs are counted in the following order. First, the C-DAIs are sorted according to the time sequence of the MOs. DCIs within the same MO are further sorted from low to high according to the carrier indexes for which the PDSCHs are scheduled. Given that a DCI can only schedule one PDSCH, C-DAI can be considered a count of DCI as well as a count of PDSCH.

Specifically, the count of PDSCHs scheduled by DCIs in MO1 is before that of PDSCHs scheduled by DCIs in MO2. MO1 contains three DCIs. According to the carrier index of PDSCH scheduled by each DCI, PDSCH scheduled by DCI3 is counted firstly as that PDSCH is located at the carrier with the lowest index (e.g., CC2), followed by DCI1 and DCI2. C-DAI adopts the counting method within a cycle of 4. That is, after counting to 4, the C-DAI of the next DL transmission is denoted as 1. For T-DAI, the DCI within the same MO contains T-DAI with the same value, which is used to represent the total number of PDSCHs for which feedback needs to be provided in the same feedback codebook up to the current MO. T-DAI also adopts the counting method within a cycle of 4. Therefore:

{c-DAI, T-DAI} in DCI3={1, 3};
{c-DAI, T-DAI} in DCI1={2, 3}; and
{c-DAI, T-DAI} in DCI2={3, 3}.

Correspondingly, the first three bits in the feedback codebook correspond to the PDSCH scheduled by DCI3, DCI1 and DCI2, respectively, in that order.

Furthermore, the PDSCHs scheduled by DCIs in the next MO (MO2) is counted in a similar way:

{c-DAI, T-DAI} in DCI5={4, 1}; and
{c-DAI, T-DAI} in DCI4={1, 1}.

Correspondingly, the 4th and 5th bits in the feedback codebook correspond to the PDSCH scheduled by DCI5 and DCI4, respectively, in that order.

It is worth noting that C-DAI=1 for the fifth PDSCH (that is, the PDSCH scheduled by DCI4), given that C-DAI adopts the counting method within the cycle of 4. As T-DAI also adopts the counting method within the cycle of 4, a total of 5 PDSCHs are scheduled up to MO2. Therefore, T-DAI=1 in DCI within MO2.

In some examples, in response to determining that all PDSCHs are correctly received, the feedback codebook is "11111." When one or more DCIs are missed or the PDSCH is not received correctly, the corresponding bit in the feedback codebook is set to 0.

If part of the carriers are configured CBG transmission (e.g., using RRC signaling "maxCodeBlockGroupsPerTransportBlock" to indicate splitting a TB into at most M CBGs), the feedback information for PDSCHs scheduled on these carriers by a DCI other than DCI format 1_0 (for example the DCI format 1_1 or DCI format 1_2) forms a sub-codebook, which can be referred to as a CBG sub-codebook.

In some examples, the UE can form another sub-codebook for PDSCH on carriers not configured with CBG transmission and PDSCH on carriers configured for CBG transmission but scheduled via DCI Format 1_0. Such sub-codebook is referred to as a "TB sub-codebook." The CBG sub-codebook and TB sub-codebook are counted respectively to determine the order of the feedback bits and the size of the sub-codebooks. The UE use the two sub-codebooks to generate the final feedback codebook in a predefined order (which is specified in the specification, or configured by signaling) by performing bits cascade. For example, the bits in the TB sub-codebook are first, and the bits in the CBG sub-codebook are second.

Each bit in the TB Sub-codebook corresponds to a TB, and each DAI count corresponds to 1 bit. Each bit in the CBG sub-codebook corresponds to a CBG, and each DAI count corresponds to the number of bits in the maximum CBG number (which can be configured by RRC signaling "maxCodeBlockGroupsPerTransportBlock").

Various arrangements disclosed herein relate to systems, methods, and non-transitory computer-readable media for structuring the DAI field in a DCI and generating a dynamic feedback codebook in scheduling more than one DL data resource (e.g., more than one PDSCH) by one DL control resource (e.g., a single PDCCH). A DCI that can schedule only one PDSCH is referred to as a Type 1 DCI (a DCI of a first type), and a DCI that can schedule more than one PDSCH is referred to as a Type 2 DCI (a DCI of a second type). While two PDSCHs scheduled by a same DCI are described in the examples herein for the sake of brevity, similar mechanisms can be used for scenarios in which more than two PDSCHs are scheduled by the same DCI. The PDSCHs scheduled by the same DCI can be located in different carriers (CCs) or on different time-domain resources of the same carrier (CC).

In some arrangements, the feedback mechanisms described herein support multiple PDSCHs scheduled by a DCI by providing for multiple PDSCHs to share C-DAI/T-DAI indicator field within a DCI and generating the corresponding dynamic codebook. Such feedback mechanisms allow improved consistency in reconciling the bit order and size of the feedback codebook between the UE and the base station, thus conserving bit overhead of DAI field in a DCI. In addition, feedback mechanisms described herein can minimize the impact of DCI loss on the reliability of the codebook by independently counting PDSCH scheduled by different DCI types.

Some arrangements relate to indicating DAI in a Type 2 DCI and generating a dynamic codebook generation. For example, PDSCHs scheduled by Type 2 DCI and Type 1 DCI are independently counted. The UE can respectively generate sub-codebooks for PDSCHs scheduled Type 2 DCI and Type 1 DCI. The UE then generates the final feedback codebook by cascading bits of the two sub-codebooks. At this point, regardless of the type of DCI, only one set of C-DAI and T-DAI are in the DCI. In other words, one C-DAI and one T-DAI are in a Type 1 DCI, and one C-DAI and one T-DAI are in Type 2 DCI. C-DAI and T-DAI in Type 2 DCI can be counted according to DCI, and the value of each DAI will correspond to a number X of bits in the feedback sub-codebook. In some arrangements, X is determined based on the number of PDSCHs scheduled by one Type 2 DCI. In one example, X is equal to the number of PDSCHs scheduled in the Type 2 DCI. In another example, the number of PDSCHs scheduled by different Type 2 DCIs are different, and X is equal to the maximum number of PDSCHs scheduled by the different Type 2 DCIs.

In some examples in which the maximum number of PDSCHs scheduled by the Type 2 DCIs is 2 (e.g., which may be defined in the specification), the DAI value in a Type 2 DCI corresponds to 2 bits in the sub-codebook (e.g., the second sub-codebook). The DAI value in each Type 1 DCI corresponds to 1 bit in the sub-codebook (e.g., the first sub-codebook).

The UE can combine the first and second sub-codebooks to form a feedback codebook by bit cascading. In one example, the feedback bits of the first sub-codebook precede those of the second sub-codebook in the bit cascading. In another example, the feedback bits of the second sub-codebook precede those of the first sub-codebook in the bit cascading.

FIG. 1 is a flow chart diagram illustrating example methods 100a and 100b for managing feedback, according to various arrangements of the present disclosure. Referring to FIG. 1, the method 100a is performed by a UE, and the method 100b corresponds to the method 100a and is performed by a base station.

At 102*b*, the base station transmits to a UE at least one of (1) first scheduling indicators (e.g., one or more Type 1 DCIs) and (2) second scheduling indicators (e.g., one or more Type 2 DCIs). Each of the first scheduling indicators schedules a transmission (e.g., a PDSCH). Each of the second scheduling indicators schedules two or more of transmissions (e.g., PDSCH)s. At 102*a*, the UE receives from the base station, at least one of first scheduling indicators and second scheduling indicators. Each first scheduling indicator schedules a transmission. Each second scheduling indicator schedules two or more of the transmissions.

At 104*a*, the UE generates at least one of a first sub-codebook and a second sub-codebook. The first sub-codebook includes one or more first feedback bits indicative of reception status of the transmissions scheduled by each of the first scheduling indicators. The second sub-codebook includes second feedback bits indicative of reception status of the transmissions scheduled by each of the second scheduling indicators.

In some examples, each of the first scheduling indicators includes a first index identifying a bit in the first sub-codebook that corresponds to the reception status of the transmission scheduled by each of the first scheduling indicators. Each of the second scheduling indicators includes a second index identifying bits in the second sub-codebook that corresponds to the reception status of the transmissions scheduled by each of the second scheduling indicators. The first indexes of the first scheduling indicators are counted independently from the second indexes of the second scheduling indicators.

In some examples, each of the first scheduling indicators and the second scheduling indicators is a DCI. Each referred transmission is a PDSCH with which the UE receives downlink data from the base station. Each of the first indexes and the second indexes is a DAI. The DAI in each of the second scheduling indicators includes a C-DAI and a T-DAI. Each count of the C-DAI or the T-DAI corresponds to a number of bits in the second sub-codebook. The number of bits is based on a number of the two or more transmissions scheduled by each of the second scheduling indicators.

In some arrangements, as described in further detail with reference to FIG. 2, the C-DAI for each of the second scheduling indicators is determined based on a carrier index (CC) of each of the one of the two or more of the transmissions scheduled by each of the second scheduling indicators. The second feedback bits are arranged according to the C-DAI for each of the second scheduling indicators. The one of the two or more of the transmissions is the transmission on a carrier with a lower carrier index than any other one of the two or more of the transmissions. Alternatively, the one of the two or more of the transmissions is the transmission on a carrier with a higher carrier index than any other one of the two or more of the transmissions.

Figure 3:
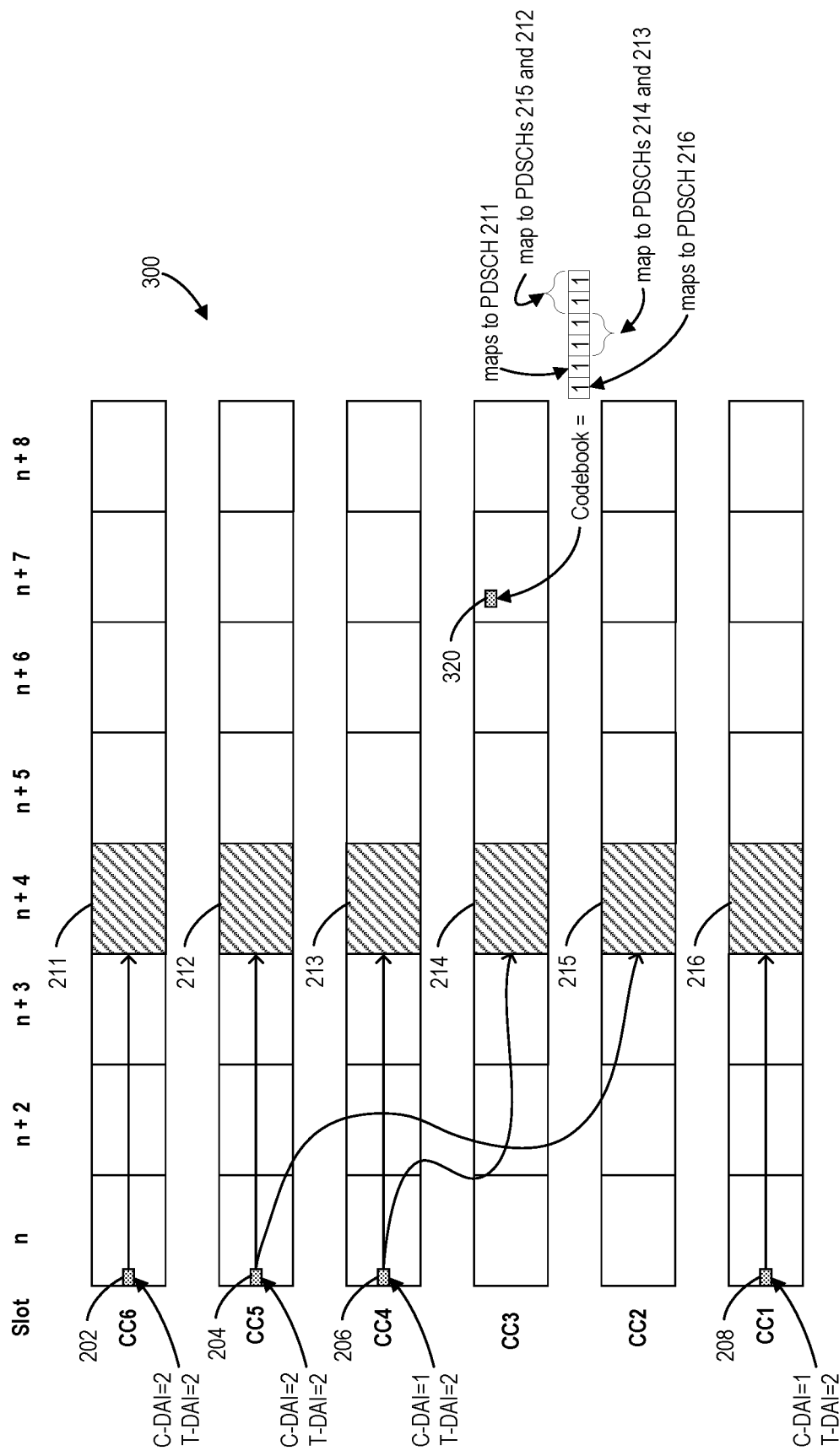
FIG. 3 is a diagram illustrating a feedback mechanism, according to various arrangements of the present disclosure.

In some arrangements, as described in further detail with reference to FIG. 3, the C-DAI for each of the second scheduling indicators is determined based on a carrier index of each of the second scheduling indicators. The second feedback bits are arranged according to the C-DAI for each of the second scheduling indicators.

In some arrangements, the second feedback bits corresponding to the two or more transmissions scheduled by the second scheduling indicator are continuous in the codebook.

In some examples, as discussed in further detail with reference to FIG. 4, the first sub-codebook includes at least one of two first sub-codebooks. A first one of the first sub-codebooks includes feedback bits corresponding to a first type of transmission (e.g., CBG) scheduled by a first one of the first scheduling indicators. A second one of the first sub-codebooks includes feedback bits corresponding to a second type of transmission (e.g., TB) scheduled by a second one of the first scheduling indicators. The second sub-codebook includes at least one of two second sub-codebooks. A first one of the second sub-codebooks includes feedback bits corresponding to the first type of transmission (CBG) scheduled by a first one of the second scheduling indicators. A second one of the second sub-codebooks includes feedback bits corresponding to the second type of transmission (TB) scheduled by a second one of the second scheduling indicators. In some examples, generating the codebook includes combining the first sub-codebook and the second sub-codebook by bit cascading the first sub-codebooks and the second sub-codebooks according to the first type of transmission, the second type of transmission, the first scheduling indicators, and the second scheduling indicators.

In some examples, two or more of the first sub-codebooks and the second sub-codebooks (e.g., 4 total sub-codebooks) can be merged to form a combined sub-codebook. For example, the method further includes generating a combined sub-codebook by merging the feedback bits of two or more of the first sub-codebooks and the second sub-codebooks. The feedback bits of two or more of the first sub-codebooks and the second sub-codebooks are combined based on scheduling modes. That is, transmissions scheduled by scheduling indicator in two or more of scheduling modes are counted together. The combined sub-codebook includes feedback bits from two or more of the scheduling modes. Each of the scheduling modes is one of the first scheduling indicator scheduling the first type of transmission, one of the first scheduling indicator scheduling the second type of transmission, one of the second scheduling indicator scheduling the first type of transmissions, or one of the second scheduling indicators scheduling the second type of transmissions.

In some examples, a number of feedback bits of the combined sub-codebook that corresponds to a DAI count is determined according to a first number of feedback bits used to provide feedback information to a first one of the two or more of the scheduling modes. The first number of feedback bits is greater than a second number of feedback bits used to provide feedback information to any other one of the two or more scheduling modes. A DAI count in the any other one of the two or more of the scheduling modes corresponds to the first number of feedback bits in the combined sub-codebook. The first number of feedback bits corresponding to the any other one of the two or more of the scheduling modes includes the second number of feedback bits and padded bits. The padded bits includes zeroes or repetition of the first number of feedback bits.

In some examples, as discussed in further detail with reference to FIG. 5, the first sub-codebook includes at least one of two first sub-codebooks. A first one of the first sub-codebooks includes feedback bits corresponding to a first type of transmission scheduled by a first one of the first scheduling indicators. A second one of the first sub-codebooks includes feedback bits corresponding to a second type of transmission scheduled by a second one of the first scheduling indicators. The second sub-codebook includes at least one of three second sub-codebooks. A first one of the second sub-codebooks includes feedback bits corresponding to the first type of transmission scheduled by a first one of the second scheduling indicators. A second one of the second sub-codebooks includes feedback bits corresponding to the second type of transmission scheduled by a second one of the second scheduling indicators. A third one of the second sub-codebooks includes feedback bits corresponding to the first type and the second type of transmission scheduled by a third one of the second scheduling indicators. In some examples, generating the codebook includes combining the first sub-codebook and the second sub-codebook by bit cascading the first sub-codebooks and the second sub-codebooks according to the first type of transmission, the second type of transmission, the first scheduling indicators, and the second scheduling indicators.

In some examples, two or more of the first sub-codebooks and the second sub-codebooks (e.g., 5 total sub-codebooks) can be merged to form a combined sub-codebook. For example, the method further includes generating a combined sub-codebook by merging the feedback bits of two or more of the first sub-codebooks and the second sub-codebooks. The feedback bits of two or more of the first sub-codebooks and the second sub-codebooks are combined based on scheduling modes. That is, transmissions scheduled by scheduling indicator in two or more of scheduling modes are counted together. The combined sub-codebook includes feedback from two or more of the scheduling modes. Each of the scheduling modes is one of the first scheduling indicator scheduling the first type of transmission, one of the first scheduling indicator scheduling the second type of transmission, one of the second scheduling indicator scheduling the first type of transmissions, one of the second scheduling indicator scheduling the second type of transmissions, or one of the second scheduling indicator scheduling the first type of transmission and the second type of transmission.

In some examples, a number of feedback bits of the combined sub-codebook that corresponds to a DAI count is determined according to a first number of feedback bits used to provide feedback information to a first one of the two or more of the scheduling modes. The first number of feedback bits is greater than a second number of feedback bits used to provide feedback information to any other one of the two or more of the scheduling modes. The any other one of the two or more of the scheduling modes corresponds to the first number of feedback bits in the combined sub-codebook. The first number of feedback bits corresponding to the any other one of the two or more of the scheduling modes includes the second number of feedback bits and padded bits. The padded bits comprise zero or repetition of the first number of feedback bits.

At 106a, the UE generates a codebook by combining the first sub-codebook and the second sub-codebook. In some examples, the codebook is generated by bit-cascading or concatenating the bits in the first sub-codebook and the second sub-codebook (each of which may refer to multiple sub-codebooks) in suitable orders as disclosed herein.

At 108a, the UE transmits the codebook to the base station. At 104b, the base station receives from the UE the codebook generated based on at least one of the first sub-codebook and the second sub-codebook. As described, the first sub-codebook includes first feedback bits indicative of reception status of the transmission scheduled by each of the first scheduling indicators. The second sub-codebook includes second feedback bits indicative of reception status of the transmissions scheduled by each of the second scheduling indicators.

At 106b, the base station determines, based on the codebook, the reception status of the transmission scheduled by each of the first scheduling indicators and the reception status of the transmissions scheduled by each of the second scheduling indicators.

Figure 2:
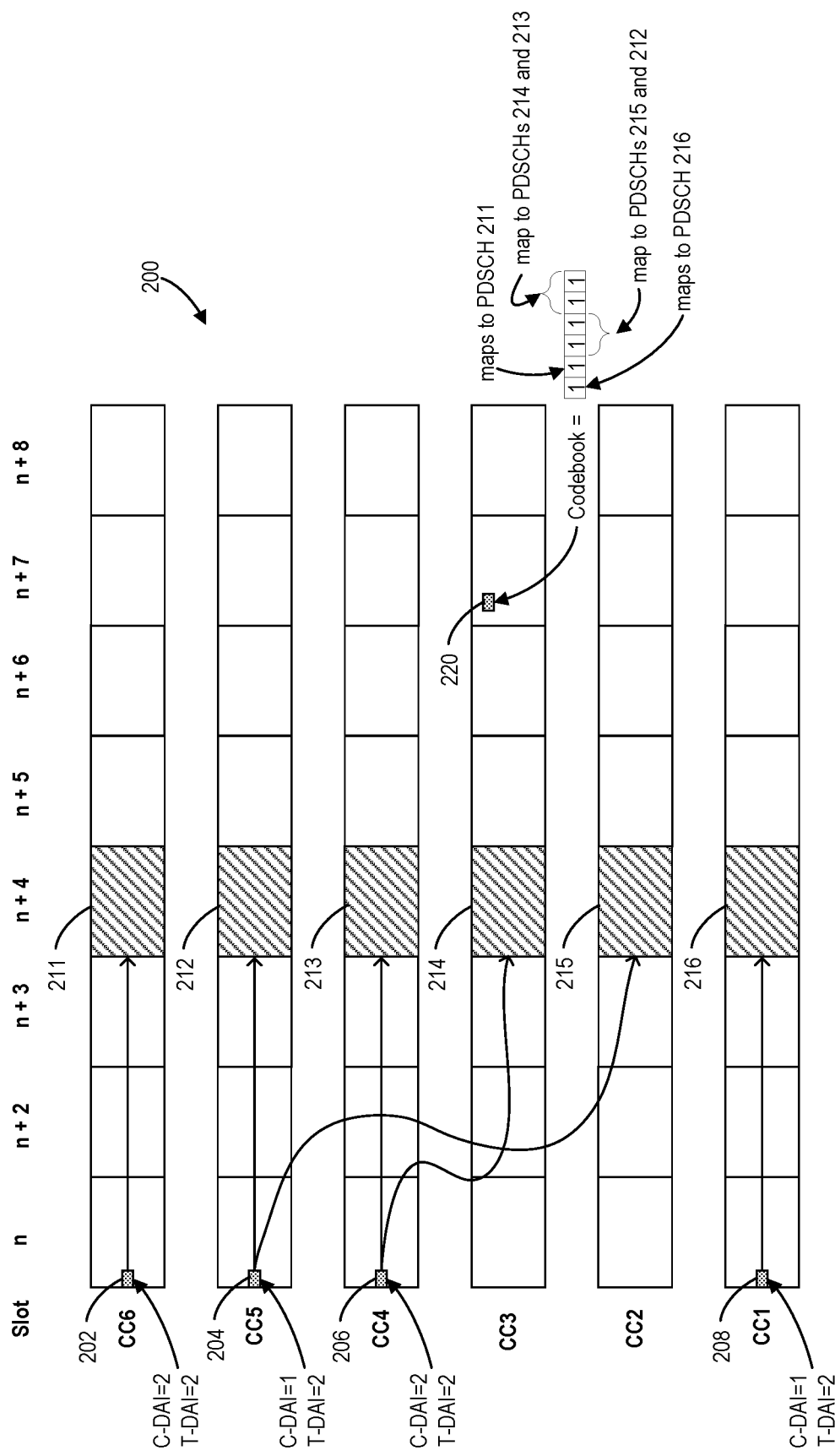
FIG. 2 is a diagram illustrating a feedback mechanism, according to various arrangements of the present disclosure.

FIG. 2 is a diagram illustrating a feedback mechanism 200, according to various arrangements. FIG. 3 is a diagram illustrating a feedback mechanism 300, according to various arrangements. FIGS. 2 and 3 illustrate a scenario in which Type 2 DCI is introduced. The UE can received data from the base station and send data to the base station via a CC group of 6 CCs (e.g., CC1-CC6). 9 slots are shown for each CC, including slot n, slot n+1, slot n+2, slot n+3, slot n+4, slot n+5, slot n+6, slot n+7, and slot n+8. The UE can monitor for any DCI in a MO (e.g., MO1) in slot n. While FIGS. 2 and 3 illustrate an example in which the DCIs 202, 204, 206 and 208 are all in a same MO in different CCs, similar feedback mechanism can be implemented for DCIs that are in different MOs.

As shown, 4 DCIs (e.g., DCI 202, DCI 204, DCI 206, and DCI 208) are received by the UE from the base station in the same MO, which correspond to a starting point of slot n. Two Type 1 DCIs 202 and 208 are on CC6 and CC1, respectively. DCI 202 schedules a PDSCH 211 in slot n+3 of CC6 in self-scheduling. DCI 208 schedules a PDSCH 216 in slot n+3 of CC1 in self-scheduling. The UE can generate a sub-codebook for providing feedback information on whether data on the PDSCH 211 (scheduled by the DCI 202) and the PDSCH 216 (scheduled by the DCI 208) is correctly received. In other words, one sub-codebook is generated for PDSCHs 211 and 216 scheduled by all Type 1 DCIs 202 and 208 corresponding to a same UL slot n+7. In some examples, the C-DAI of Type 1 DCI 208 in CC1 is denoted as 1, and C-DAI of Type 1 DCI 202 in CC6 are denoted as 2. In this MO, T-DAI in Type 1 DCIs 202 and 208 is denoted as 2.

As shown, 2 Type 2 DCIs 204 and 206 are on CC5 and CC4, respectively. DCI 204 schedules a PDSCH 212 in slot n+3 of CC5 in self-scheduling and a PDSCH 215 in slot n+3 of CC2 in cross-carrier scheduling. DCI 206 schedules a PDSCH 213 in slot n+3 of CC4 in self-scheduling and a PDSCH 214 in slot n+3 of CC3 in cross-carrier scheduling. The UE can generate a sub-codebook for providing feedback information on whether data on the PDSCHs 212 and 215 (scheduled by the DCI 204) and the PDSCHs 213 and 214 (scheduled by the DCI 206) is correctly received. In other words, one sub-codebook is generated for all PDSCHs 212-215 scheduled by Type 2 DCIs 204 and 206 corresponding to a same UL slot n+7.

Various methods can be employed to determine C-DAI in each of the Type 2 DCIs 204 and 206, including at least a first method and a second method.

In the first method corresponding to the feedback mechanism 200, the UE selects one of the PDSCHs scheduled by each Type 2 DCI as a reference to determine the C-DAI for each Type 2 DCI. In some examples, the UE can select the PDSCH with the lowest CC index as the reference for each Type 2 DCI. In some arrangements, the method by which the reference PDSCH is selected for each Type 2 DCI can be predefined by the specification or configured by Radio Resource Control (RRC) signaling received from the base station.

With reference to the feedback mechanism 200, for example, out of the PDSCHs 213 and 214 scheduled by the Type 2 DCI 206, the PDSCH 214 on CC3 is selected as the reference as the PDSCH 214 has the lowest CC index. Out of the PDSCHs 212 and 215 scheduled by the Type 2 DCI 204, the PDSCH 215 on CC2 is selected as the reference as the PDSCH 215 has the lowest CC index. The reference PDSCHs 214 and 215 are then sorted according to a suitable order (e.g., according to the indexes of the CCs in which the reference PDSCHs 214 and 215 are located, from low to high), and then the value of the C-DAI fields in the Type 2 DCIs 204 and 206 are determined based on the sorted order. For example, the C-DAI of the Type 2 DCI having the PDSCH with the lowest CC index is set to a predetermined value (e.g., a lowest value such as 1) while the C-DAI of the Type 2 DCI having the PDSCH with the second lowest CC index is set to another predetermined value (e.g., a second lowest value such as 2). As shown, the C-DAI in the Type 2 DCI 204 and the C-DAI of the Type 2 DCI 206 are, respectively, 1 and 2. The value of T-DAI in both Type 2 DCI is 2.

In some arrangements, after determining the values of the C-DAI and the T-DAI in each Type 2 DCI according to the first method, the codebook can be determined accordingly. As shown in the feedback mechanism 200, a codebook 220 contains a number of bits (e.g., 6 bits) that is the same as the number of PDSCHs 211-216 scheduled by the DCIs 202, 204, 206, and 208, assuming that all are TB transmissions and no two codewords are configured. The first bit of the codebook 220 corresponds to the reception status of the PDSCH 216 in CC1, the second bit of the codebook 220 corresponds to the reception status of the PDSCH 211 in CC6, the third and fourth bits of the codebook 220 respectively correspond to the reception status of two PDSCHs 212 and 215 scheduled by the Type 2 DCI 204 in CC5 (the reception status of the PDSCH 215 in CC2 corresponds to the third bit, and the reception status of the PDSCH 212 in CC5 corresponds to the fourth bit), and the 5th and 6th bits of the codebook 220 respectively correspond to the reception status of the two PDSCHs 213 and 214 scheduled by the Type 2 DCI 206 in CC4 (the reception status of the PDSCH 214 in CC3 corresponds to the 5th bit, and the reception status of the PDSCH 213 in CC4 corresponds to the 6th bit). In other words, the bits in the codebook 220 is determined by bit cascading, such that the feedback bits of the Type 1 DCIs 202 and 208 (arranged according to their respective C-DAIs) are arranged before the feedback bits of the Type 2 DCIs 204 and 206 (arranged according to their respective C-DAIs).

In mapping relationship between bits in the codebook 220 and DL transmissions, multiple PDSCHs scheduled by a Type 2 DCI occupy multiple continuous bits in the codebook 220. That is, PDSCHs 212 and 215 scheduled by the Type 2 DCIs 204 occupy multiple continuous bits in the codebook 220; and PDSCHs 213 and 214 scheduled by the Type 2 DCIs 206 occupy multiple continuous bits in the codebook 220. The two PDSCHs (e.g., 213 and 214) scheduled by a Type 2 DCI (e.g., 206) correspond to the feedback bits in the order from low to high in CC indexes, that is, in the two PDSCHs scheduled by a Type 2 DCI, the PDSCH (e.g., 214) with the lower CC index occupies an earlier bit.

In the second method, the C-DAIs of the Type 2 DCIs are determined by sorting to the CC indexes of the Type 2 DCIs, for example, from low to high. For example, in the feedback mechanism 300, the CC index of the Type 2 DCI 204 is 5, and the CC index of the Type 2 DCI 206 is 4. Sorting the CC indexes form low to high, the Type 2 DCI 206 is first, and Type 2 DCI 204 is second. The C-DAI of the Type 2 DCI having the lowest CC index is set to a predetermined value (e.g., a lowest value such as 1) while the C-DAI of the Type 2 DCI having the second lowest CC index is set to another predetermined value (e.g., a second lowest value such as 2), and so on. For example, C-DAI in the Type 2 DCI 206 is 1, and C-DAI in Type 2 DCI 204 is 2. The value of T-DAI in both Type 2 DCIs 204 and 206 is 2.

In some arrangements, after determining the values of the C-DAI and the T-DAI in each Type 2 DCI according to the second method, the codebook can be determined accordingly. As shown in the feedback mechanism 300, a codebook 320 contains a number of bits (e.g., 6 bits) that is the same as the number of PDSCHs 211-216 scheduled by the DCIs 202, 204, 206, and 208, assuming that all are TB transmissions and no two codewords are configured. The first bit of the codebook 320 corresponds to the reception status of the PDSCH 216 in CC1, the second bit of the codebook 320 corresponds to the reception status of the PDSCH 211 in CC6, the third and fourth bits of the codebook 320 respectively correspond to the reception status of the two PDSCHs 213 and 214 scheduled by the Type 2 DCI 206 in CC4 (the reception status of the PDSCH 214 in CC3 corresponds to the third bit, and the reception status of the PDSCH 213 in CC4 corresponds to the fourth bit), and the fifth and sixth bits of the codebook 320 respectively correspond to the reception status of two PDSCHs 212 and 215 scheduled by the Type 2 DCI 204 in CC5 (the reception status of the PDSCH 215 in CC2 corresponds to the fifth bit, and the reception status of the PDSCH 212 in CC5 corresponds to the sixth bit).

In mapping relationship between bits in the codebook 320 and DL transmissions, the multiple PDSCHs scheduled by a Type 2 DCI occupy multiple continuous bits in the codebook 220. That is, PDSCHs 212 and 215 scheduled by the Type 2 DCIs 204 occupy multiple continuous bits in the codebook 220; and PDSCHs 213 and 214 scheduled by the Type 2 DCIs 206 occupy multiple continuous bits in the codebook 320. The multiple PDSCHs 212, 213, 214, and 215 scheduled by the Type 2 DCIs 204 and 206 correspond to the feedback bits according to the order of CC indexes of the Type 2 DCIs 204 and 206 from low to high. In an example in which two PDSCHs are scheduled by a Type 2 DCI, the two PDSCHs correspond to two continuous bits in the codebook 320, and the PDSCH with the lower CC index corresponds to the prior bit in the codebook 320.

Alternatively, the multiple PDSCHs 212, 213, 214, and 215 scheduled by the Type 2 DCIs 204 and 206 correspond to the feedback bits according to the order of CC indexes of the Type 2 DCIs 204 and 206 from high to low. In an example in which two PDSCHs are scheduled by a Type 2 DCI, the two PDSCHs correspond to two continuous bits in the codebook 320, and the PDSCH with the higher CC index corresponds to the prior bit in the codebook 320.

In some arrangements, the bits in the codebook 320 is determined by bit cascading, such that the feedback bits of the Type 1 DCIs 202 and 208 (arranged according to their respective C-DAIs) are arranged before the feedback bits of the Type 2 DCIs 204 and 206 (arranged according to their respective C-DAIs).

In some arrangements in which Type 2 DCIs are implemented, and some of the CCs are configured for CBG transmission, a maximum of 4 sub-codebooks can be supported. The feedback information (e.g., feedback bits) in each of those 4 sub-codebooks can correspond to reception status of PDSCHs as described below.

For example, with respect to a first sub-codebook, the feedback bits in the first sub-codebook correspond to reception status of two PDSCHs scheduled through a Type 2 DCI. Each of the PDSCHs is transmitted on a different CC. Both of the CCs are configured with CBG transmission. In other words, one or more CBGs are carried on each of the PDSCHs.

With respect to a second sub-codebook, the feedback bits in the second sub-codebook correspond to reception status of two PDSCHs scheduled through a Type 2 DCI. Each of the PDSCHs is transmitted on a different CC. Both of the CCs are not configured with CBG transmission. In other words, a TB is carried on each of the PDSCHs.

With respect to a third sub-codebook, the feedback bits in the third sub-codebook correspond to the reception status of a PDSCH that is on a CC configured for CBG transmission and is not scheduled by DCI format 1_0. That is, the PDSCH is scheduled by a Type 1 DCI having DCI format 1_1 or DCI Format 1_2. In other words, one or more CBGs are carried on the PDSCH. A Type 1 DCI can have one of various DCI formats such as but not limited to, DCI format 1_0, DCI format 1_1, and DCI format 1_2.

With respect to a fourth sub-codebook, the feedback bit in the fourth sub-codebook correspond to the reception status of 1) a PDSCH that is on the CC not configured for CBG transmission and is scheduled by a Type 1 DCI, and 2) a PDSCH on the CC configured for CBG transmission and is scheduled by a Type 1 DCI with DCI format 1_0. In other words, a TB is carried on each PDSCH, the reception status of which corresponds to the feedback bits in the fourth sub-codebook.

FIG. 4 is a table 400 illustrating a number of feedback bits corresponding to each DAI count for the 4 different sub-codebooks, according to various arrangements of the present disclosure. A maximum number of CBGs carried on a PDSCH can be configured as N by the base station via RRC signaling "maxCodeBlockGroupsPerTransportBlock." As shown, the first sub-codebook, which includes feedback bits corresponding to a Type 2 DCI configured for CBG transmissions on both CCs, has 2*N feedback bits. The second sub-codebook, which includes feedback bits corresponding to a Type 2 DCI configured for TBs on both CCs, has 2 feedback bits (one for each TB). The third sub-codebook, which includes feedback bits corresponding to a Type 1 DCI configured for CBG transmission, has N feedback bits. The fourth sub-codebook, which includes feedback bits corresponding to a Type 1 DCI configured for TB transmission, has 1 feedback bit.

Given that the Type 2 DCI scheduling two PDSCHs is described herein for illustrative purposes, in the example in which the Type 2 DCI schedules two TB PDSCH transmissions, the number of feedback bits corresponding to one DAI count is 2 (e.g., Q=2). In the examples in which the number of PDSCHs scheduled by a Type 2 DCI is Q, if the Q PDSCHs are transmitted by CBG, the number of feedback bits corresponding to a DAI count is Q*N for the first sub-codebook. If the Q PDSCHs are transmitted by TB, the number of feedback bits corresponding to a DAI count is Q for the second sub-codebook.

For each of the 4 sub-codebooks, the order by which the DAIs are counted can be determined using the methods described herein, including at least the feedback mechanisms 200 and 300.

In some arrangement, the UE can form the final feedback codebook by concatenating or cascading the 4 sub-codebooks (instead two). The cascading sequence of the 4 sub-codebooks in the final feedback codebook can be pre-defined in the protocol or configured to the UE through RRC signaling by the base station.

In one example, the TB-level sub-codebooks are cascaded before the CBG-level sub-codebooks. For the TB-level sub-codebooks or the CBG-level sub-codebooks, the sub-codebook corresponding to Type 1 DCI is cascaded before the sub-codebook corresponding to Type 2 DCI. According to such cascading sequence, the order by which the four feedback codebooks are cascaded in is: the fourth sub-codebook, the second sub-codebook, the third sub-codebook, and the first sub-codebook.

In another example, the sub-codebooks corresponding to Type 1 DCIs are cascaded before the sub-codebooks corresponding to Type 2 DCIs. For the two sub-codebooks corresponding to Type 1 DCIs or the two sub-codebooks corresponding to Type 2 DCIs, TB-level sub-codebook is cascaded before CBG-level sub-codebook. According to such cascading sequence, the order by which the four feedback codebooks are cascaded in is: the fourth sub-codebook, the third sub-codebook, the second sub-codebook, and the first sub-codebook. Other predefined or configured cascading sequences can be implemented.

In some arrangements, the final feedback codebook may be generated from some but not all of the 4 sub-codebooks. In one example, for PDSCHs scheduled by a Type 2 DCI, CBG transmission does not exist. In such example, the first sub-codebook is not used in generating the final feedback codebook, and the final feedback codebook is generated from cascading the fourth, third and second sub-codebooks, in that order.

In addition, the occurrence of a certain type of scheduling can be restricted as required in the specification. Thus, one of the 4 sub-codebooks corresponding to the restricted type of scheduling is not taken into account in generating the final codebook. For example, PDSCH scheduled by a Type 2 DCI is treated as TB regardless of whether the CC that the PDSCH is on is configured for CBG transmission. In this example, the first sub-codebook is restricted, and only three out of the 4 sub-codebooks are defined. The final feedback codebook is generated using at most 3 sub-codebooks.

In the implementation described herein relative to 4 sub-codebooks, it is assumed that the two PDSCHs scheduled by a same Type 2 DCI are transmitted with the same attribute. That is, both PDSCHs are TB transmissions (the CC is not configured with CBG transmission), or both PDSCHs are CBG transmissions (the CC is configured with CBG transmission). In other implementations (one involving 5 sub-codebooks), the two PDSCHs that are allowed to be scheduled by a Type 2 DCI with different transmission attributes. For example, one of the two PDSCHs is a TB transmission (the CC is not configured with CBG transmission) and another one of the two PDSCHs is a CBG transmission (the CC is configured with CBG transmission). In that regard, an additional sub-codebook is added for containing feedback information (feedback bits) for PDSCHs scheduled by a same Type 2 DCI with different transmission attributes.

In the example in which two PDSCHs scheduled by a Type 2 DCI, the CC of one of the two PDSCHs is configured with CBG transmission (one or more CBGs are carried on this PDSCH), and the CC of another one of the two PDSCHs is not configured with CBG transmission (a TB is carried on this PDSCH). A fifth sub-codebook can be implemented to include feedback bits for such PDSCHs scheduled by the Type 2 DCI.

FIG. 5 is a table 500 illustrating a number of feedback bits corresponding to each DAI count for the 5 different sub-codebooks, according to various arrangements of the present disclosure. As described, a maximum number of CBGs carried on a PDSCH can be configured as N by the base station via RRC signaling "maxCodeBlockGroupsPerTransportBlock." As shown, the first sub-codebook, which includes feedback bits corresponding to a Type 2 DCI configured for CBG transmissions on both CCs, has 2*N feedback bits. The second sub-codebook, which includes feedback bits corresponding to a Type 2 DCI configured for TBs on both CCs, has 2 feedback bits (one for each TB). The third sub-codebook, which includes feedback bits corresponding to a Type 1 DCI configured for CBG transmission, has N feedback bits. The fourth sub-codebook, which includes feedback bits corresponding to a Type 1 DCI configured for TB transmission, has 1 feedback bit. The fifth sub-codebook, which includes feedback bits corresponding to a Type 2 DCI configured for both CBG and TB transmissions, has N+1 feedback bits.

Given that the Type 2 DCI scheduling two PDSCHs is described herein for illustrative purposes, in the example in which the Type 2 DCI schedules two TB PDSCH transmissions, the number of feedback bits corresponding to one DAI count is 2 (e.g., Q=2). In the examples in which the number of PDSCHs scheduled by a Type 2 DCI is Q, if the Q PDSCHs are transmitted by CBG, the number of feedback bits corresponding to a DAI count is Q*N for the first sub-codebook. If the Q PDSCHs are transmitted by TB, the number of feedback bits corresponding to a DAI count is Q for the second sub-codebook.

For each of the 5 sub-codebooks, the order by which the DAIs are counted can be determined using the methods described herein, including at least the feedback mechanisms 200 and 300.

In some arrangement, the UE can form the final feedback codebook by cascading the 5 sub-codebooks (instead 2 or 4). The cascading sequence of the 5 sub-codebooks in the final feedback codebook can be predefined in the protocol or configured to the UE through RRC signaling by the base station.

In one example, the sub-codebooks corresponding to Type 1 DCIs are cascaded before the sub-codebooks corresponding to Type 2 DCIs. For the two sub-codebooks corresponding to Type 1 DCIs, TB-level sub-codebook is cascaded before CBG-level sub-codebook. For the three sub-codebooks corresponding to Type 2 DCIs, the sub-codebook containing feedback bits for both TB and CBG transmissions is cascaded before the TB-level sub-codebook, which is cascaded before the CBG-level sub-codebook. According to such cascading sequence, the order by which the five feedback codebooks are cascaded in is: the fourth sub-codebook, the third sub-codebook, the fifth sub-codebook, the second sub-codebook, and the first sub-codebook. Other predefined or configured cascading sequences can be implemented.

As described with reference to the tables 400 and 500, there can be more than one sub-codebook for each of the Type 1 and Type 2 DCIs. In some arrangements, feedback bits of the sub-codebooks can be merged into one sub-codebook. As used herein, different scheduling modes include but are not limited to, a Type 1 DCI scheduling a TB transmission, a Type 1 DCI scheduling a CBG transmission, a Type 2 DCI scheduling two TB transmissions, a Type 2 DCI scheduling two CBG transmissions, and a Type 2 DCI scheduling a TB transmission and a CBG transmission. PDSCHs scheduled by DCIs in different scheduling modes are counted together. The feedback bits corresponding to PDSCHs received in the different scheduling modes can be merged into a sub-codebook. As used herein, merging two sub-codebooks into a combined sub-code-book refers to generating one combined sub-codebook what includes feedback bits that would otherwise be included in two sub-codebooks as disclosed with reference to FIG. 4 or 5. The number of feedback bits corresponding to a DAI count is determined according to the scheduling mode needing more feedback bits corresponding to a DAI count.

For a scheduling mode needing fewer feedback bits corresponding to a DAI count, in addition to containing effective feedback information, the remaining bits are padded with zero, or, repetitions of the effective feedback bits.

For example, in a first merge mode 1, the final codebook is generated from a CBG codebook and a TB sub-codebooks. The UE is configured to generate a first sub-codebook contains feedback bits corresponding to PDSCHs scheduled by one or more Type 1 DCIs and one or more Type 2 DCIs with CCs configured for CBG. The UE is further configured to generate a second sub-codebook contains feedback bits corresponding to PDSCHs scheduled by one or more Type 1 DCIs and one or more Type 2 DCIs with CCs configured for TBs.

A C-DAI count for the first sub-codebook corresponds to 2*N bits, where N is the largest number of CBGs. The number of CBGs can be configured by the base station (receive from the base station) via a RRC parameters such as "maxCodeBlockGroupsPerTransportBlock." The number of feedback bits for the PDSCH scheduled by a Type 1 DCI is also 2*N. The 2*N feedback bits contain M effective bits are effective feedback information. The effective bits correspond to M CBGs scheduled by a Type 1 DCI, where M≤N. The remaining (2*N−M) bits can be filled with filler bits (e.g., zeros, or repetition of the effective feedback bits). The M bits of effective feedback information can occupy the first M bit of the total 2*N feedback bits. For example, the first M bits can be referred to as M Most Significant Bits (MSBs).

In alternatively examples, the number of CBGs scheduled by a Type 2 DCI can be limited to half of N, and a C-DAI count of the first sub-codebook represents N bits.

A C-DAI count for the second sub-codebook corresponds to 2 bits. The PDSCH scheduled by a Type 1 DCI corresponds to 2 feedback bits in the second sub-codebook. In the 2 feedback bits, 1 bit is the effective feedback information that corresponds to 1 TB scheduled by the Type 1 DCI, and another 1 bit is filled with filler bits (e.g., zeros, or repetition of the effective feedback bits). The effective feedback information occupies the first 1 bit of the 2 bits, in some examples.

In a second merge mode, feedback bits corresponding to PDSCHs carrying CBG transmission scheduled by Type 1 DCIs (CBG+Type 1 DCI) and feedback bits corresponding to PDSCHs carrying TB transmissions scheduled by Type 2 DCIs (TB+type 2 DCI) are merged into a sub-codebook (referred to as sub-codebook x).

The number of bits in sub-codebook x corresponding to a C-DAI count equals to Max {N, Q}. N is the largest number of CBGs, which can be configured by the base station RRC parameters "maxCodeBlockGroupsPerTransportBlock." Q is the number of PDSCHs scheduled by a Type 2 DCI.

In the example in which N>Q, Q PDSCHs scheduled by a Type 2 DCI also occupy N bits in the feedback codebook x, in which Q effective bits correspond to reception status of Q PDSCHs. The Q effective bits are the effective feedback information, which can be the first Q bits of the total N bits. The remaining (N−Q) bits are padded with filler bits (e.g., zeros, or repetition of the effective feedback bits). The Q bits of effective feedback information can occupy the first Q bit of the total N feedback bits. For example, the first Q bits can be referred to as Q Most Significant Bits (MSBs).

In the example in which N<Q, the reception status of N CBGs contained in the PDSCH scheduled by a Type 1 DCI also occupy Q bit in the feedback codebook x, in which N effective bits correspond to N CBGs. The N effective bits are the effective feedback information, which can be the first N bits of the total Q bits. The remaining (Q-N) bits are filled with filler bits (e.g., zeros, or repetition of the effective feedback bits). The N bits of effective feedback information can occupy the first N bit of the total Q feedback bits.

As described with reference to table 500, PDSCHs scheduled by a Type 2 DCI may have two different attributes, namely TB transmission and CBG transmission. In a third merge mode, feedback bits corresponding to reception status of CBG transmissions scheduled by a Type 1 DCI (CBG+Type 1 DCI) is combined with feedback bits corresponding to reception status of one TB transmission and one CBG transmission scheduled by a Type 2 DCI (TB+CBG+Type 2 DCI) to form a sub-codebook, referred to as sub-codebook y.

A C-DAI count corresponds to (N+1) bits in sub-codebook y, where N is the largest number of CBGs, which can be configured by the base station via RRC parameters "maxCodeBlockGroupsPerTransportBlock." The (N+1) bits respectively correspond to a TB and N CBGs scheduled by a type 2 DCI. For the PDSCHs scheduled by the Type 1 DCI, N bits corresponds to N CBGs, and the remaining 1 bit can be filled with a filler bit (e.g., a zero).

Alternatively, the sub-codebook can be determined according to the RRC configuration received from the base station. In the examples in which no CC is configured with CBG in the CC group, the UE forms two sub-codebooks, a Type 1 DCI sub-codebook (including feedback bits corresponding to PDSCHs scheduled by Type 1 DCIs) and a Type 2 DCI sub-codebook (including feedback bits corresponding to PDSCHs scheduled by Type 2 DCIs). In the examples in which at least a CC in the CC group is configured with CBG, the UE forms two sub-codebooks, a CBG sub-codebook (including feedback bits corresponding to PDSCHs carrying CBG transmissions scheduled by Type 1 and Type 2 DCIs) and TB sub-codebook (including feedback bits corresponding to PDSCHs carrying TB transmissions scheduled by Type 1 and Type 2 DCIs).

In some examples, the merged sub-codebooks can be bit-cascaded in any suitable order to form the final codebook.

Figure 6:
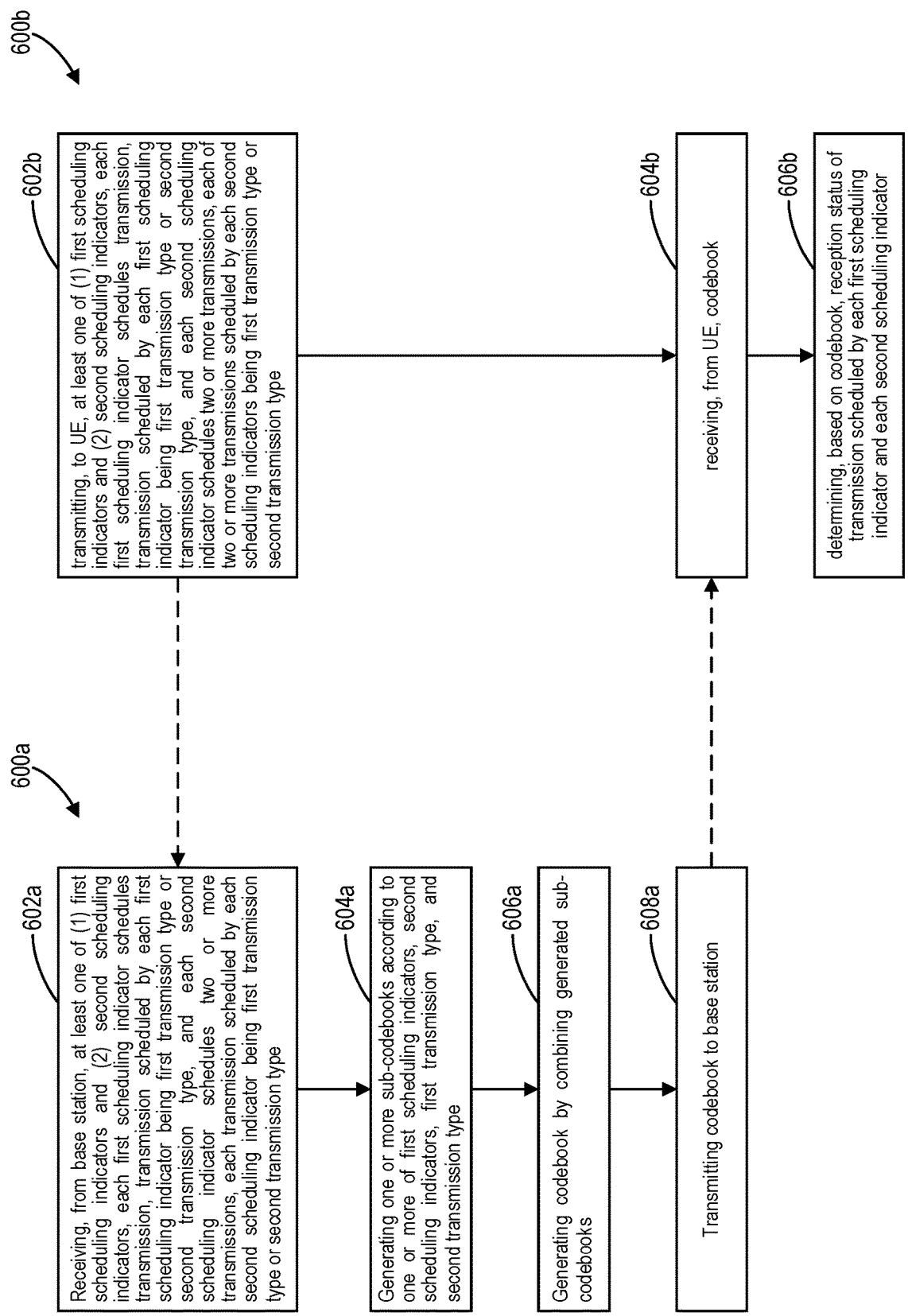
FIG. 6 is a flow chart diagram illustrating an example method for managing feedback, according to various arrangements of the present disclosure.

FIG. 6 is a flow chart diagram illustrating example methods 600a and 600b for managing feedback, according to various arrangements of the present disclosure. Referring to FIGS. 1-6, the method 600a is performed by a UE, and the method 600b corresponds to the method 600a and is performed by a base station.

At 602b, the base station transmits to a UE at least one of (1) first scheduling indicators (e.g., one or more Type 1 DCIs) and (2) second scheduling indicators (e.g., one or more Type 2 DCIs). At 602a, the UE receives from the base station at least one of (1) first scheduling indicators and (2) second scheduling indicators. Each of the first scheduling indicators schedules a transmission. The transmission scheduled by each of the first scheduling indicators is a first transmission type or a second transmission type. Each of the second scheduling indicators schedules two or more of the transmissions. Each of the two or more of the transmissions scheduled by each of the second scheduling indicators is the first transmission type or the second transmission type.

At 604a, the UE generates one or more sub-codebooks according to one or more of the first scheduling indicators, the second scheduling indicators, the first transmission type, and the second transmission type.

In some examples, each of the one or more sub-codebooks is generated based on one or more scheduling modes. Each of the scheduling modes is one of the first scheduling indicators scheduling the first type of transmission, one of the first scheduling indicators scheduling the second type of transmission, one of the second scheduling indicators scheduling the first type of transmissions, one of the second scheduling indicators scheduling the second type of transmissions, or one of the second scheduling indicators scheduling the first type of transmission and the second type of transmission.

In some examples, the one or more sub-codebooks includes a first sub-codebook, a second sub-codebook, a third sub-codebook, a fourth sub-codebook, as described with reference to FIG. 4. In further examples, the one or more sub-codebooks further includes and a fifth sub-codebook as described with reference to FIG. 5. Generating the one or more sub-codebooks based on the first scheduling indicators, the second scheduling indicators, the first transmission type, and the second transmission type includes at least one of: generating a first sub-codebook based on one of the second scheduling indicators scheduling the first type of transmissions, generating a second sub-codebook based on one of the second scheduling indicators scheduling the second type of transmissions, generating a third sub-codebook based on one of the first scheduling indicators scheduling the first type of transmission, generating a fourth sub-codebook based on one of the first scheduling indicators scheduling the second type of transmission, or generating a fifth sub-codebook based on one of the second scheduling indicator scheduling the first type of transmission and the second type of transmission.

In some examples, the UE can generate a combined sub-codebook by merging two or more of the sub-codebooks. A number of feedback bits of the combined sub-codebook that corresponds to a DAI count is determined according to a first number of feedback bits used to provide feedback information to a first one of the two or more of the sub-codebooks. The first number of feedback bits being greater than a second number of feedback bits used to provide feedback information to any other one of the two or more of the sub-codebooks. A DAI count in the any other one of the two or more of the sub-codebooks corresponds to the first number of feedback bits in the combined sub-codebook. The first number of feedback bits corresponding to the any other one of the two or more of the sub-codebooks includes the second number of feedback bits and padded bits. The padded bits comprise zero or repetition of the first number of feedback bits.

At 606a, the UE generates a codebook by combining the generated one or more sub-codebooks. In some examples, the codebook is generated by bit-cascading or concatenating the bits in the sub-codebooks (e.g., the 4 sub-codebooks, the 5 sub-codebooks, and so on). In some examples, the codebook is generated by bit-cascading or concatenating the bits in the combined sub-codebook (obtained by merging two sub-codebooks) with bits in other combined sub-codebooks or with sub-codebooks.

At 608, the UE transmits the codebook to the base station. At 604b, the base station receives from the UE a codebook generated based on one or more sub-codebooks. The one or more sub-codebooks are generated by the UE according to the first scheduling indicators, the second scheduling indicators, the first transmission type, and the second transmission type. At 606b, the base station determines based on the codebook the reception status of the transmission scheduled by each of the first scheduling indicators and the reception status of the transmissions scheduled by each of the second scheduling indicators.

Figure 7B:
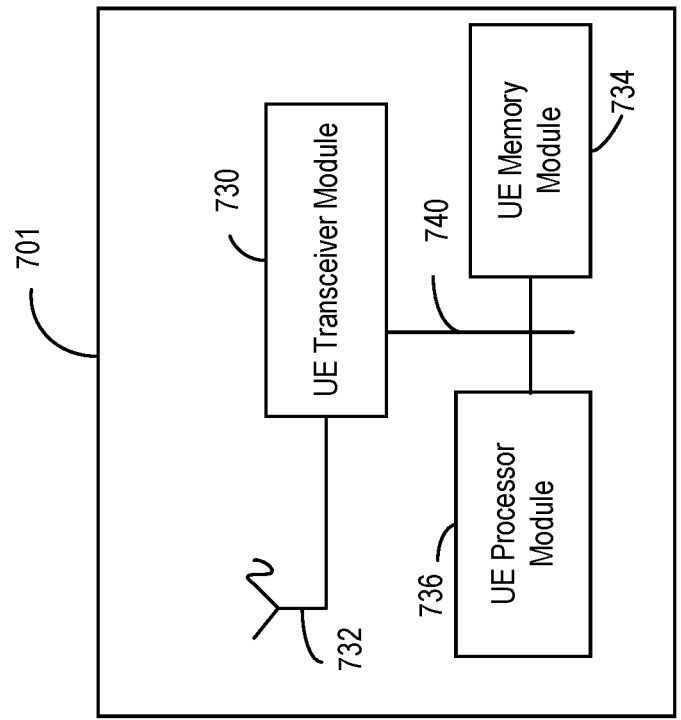
FIG. 7B illustrates a block diagram of an example UE, in accordance with some embodiments of the present disclosure.
Figure 7A:
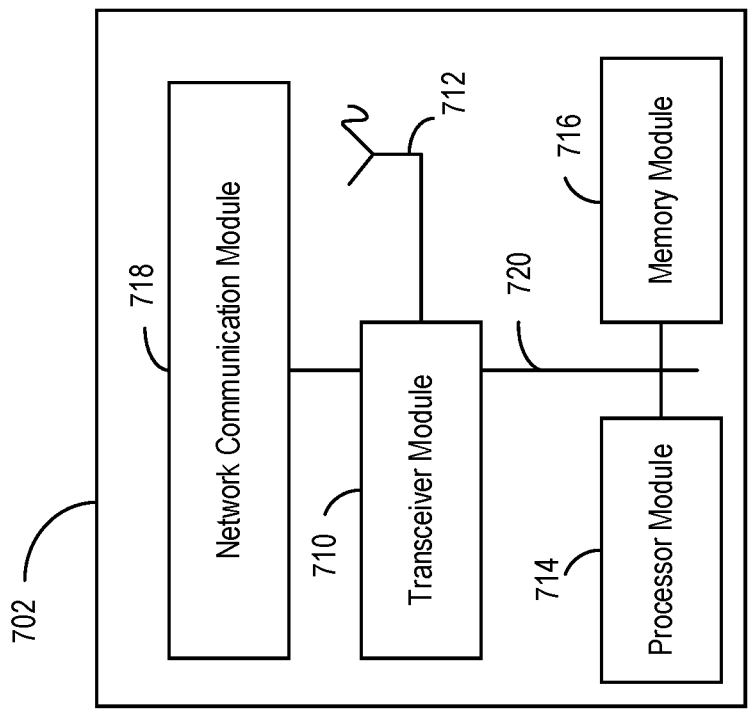
FIG. 7A illustrates a block diagram of an example base station, in accordance with some embodiments of the present disclosure.

FIG. 7A illustrates a block diagram of an example BS 702, in accordance with some embodiments of the present disclosure. FIG. 7B illustrates a block diagram of an example UE 701, in accordance with some embodiments of the present disclosure. Referring to FIGS. 1-7B, the UE 701 (e.g., a wireless communication device, a terminal, a mobile device, a mobile user, and so on) is an example implementation of the UEs described herein, and the BS 702 is an example implementation of the BS described herein.

The BS 702 and the UE 701 can include components and elements configured to support known or conventional operating features that need not be described in detail herein. In one illustrative embodiment, the BS 702 and the UE 701 can be used to communicate (e.g., transmit and receive) data symbols in a wireless communication environment, as described above. For instance, the BS 702 can be a BS (e.g., gNB, eNB, and so on), a server, a node, or any suitable computing device used to implement various network functions.

The BS 702 includes a transceiver module 710, an antenna 712, a processor module 714, a memory module 716, and a network communication module 718. The module 710, 712, 714, 716, and 718 are operatively coupled to and interconnected with one another via a data communication bus 720. The UE 701 includes a UE transceiver module 730, a UE antenna 732, a UE memory module 734, and a UE processor module 736. The modules 730, 732, 734, and 736 are operatively coupled to and interconnected with one another via a data communication bus 740. The BS 702 communicates with the UE 701 or another BS via a communication channel, which can be any wireless channel or other medium suitable for transmission of data as described herein.

As would be understood by persons of ordinary skill in the art, the BS 702 and the UE 701 can further include any number of modules other than the modules shown in FIGS. 7A and 7B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 730 includes a radio frequency (RF) transmitter and a RF receiver each including circuitry that is coupled to the antenna 732. A duplex switch (not shown) may alternatively couple the RF transmitter or receiver to the antenna in time duplex fashion. Similarly, in accordance with some embodiments, the transceiver 710 includes an RF transmitter and a RF receiver each having circuitry that is coupled to the antenna 712 or the antenna of another BS. A duplex switch may alternatively couple the RF transmitter or receiver to the antenna 712 in time duplex fashion. The operations of the two-transceiver modules 710 and 730 can be coordinated in time such that the receiver circuitry is coupled to the antenna 732 for reception of transmissions over a wireless transmission link at the same time that the transmitter is coupled to the antenna 712. In some embodiments, there is close time synchronization with a minimal guard time between changes in duplex direction.

The UE transceiver 730 and the transceiver 710 are configured to communicate via the wireless data communication link, and cooperate with a suitably configured RF antenna arrangement 712/732 that can support a particular wireless communication protocol and modulation scheme. In some illustrative embodiments, the UE transceiver 730 and the transceiver 710 are configured to support industry standards such as the Long Term Evolution (LTE) and emerging 5G standards, and the like. It is understood, however, that the present disclosure is not necessarily limited in application to a particular standard and associated protocols. Rather, the UE transceiver 730 and the BS transceiver 710 may be configured to support alternate, or additional, wireless data communication protocols, including future standards or variations thereof.

The transceiver 710 and the transceiver of another BS (such as but not limited to, the transceiver 710) are configured to communicate via a wireless data communication link, and cooperate with a suitably configured RF antenna arrangement that can support a particular wireless communication protocol and modulation scheme. In some illustrative embodiments, the transceiver 710 and the transceiver of another BS are configured to support industry standards such as the LTE and emerging 5G standards, and the like. It is understood, however, that the present disclosure is not necessarily limited in application to a particular standard and associated protocols. Rather, the transceiver 710 and the transceiver of another BS may be configured to support alternate, or additional, wireless data communication protocols, including future standards or variations thereof.

In accordance with various embodiments, the BS 702 may be a BS such as but not limited to, an eNB, a serving eNB, a target eNB, a femto station, or a pico station, for example. The BS 702 can be an RN, a DeNB, or a gNB. In some embodiments, the UE 701 may be embodied in various types of user devices such as a mobile phone, a smart phone, a personal digital assistant (PDA), tablet, laptop computer, wearable computing device, etc. The processor modules 714 and 736 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 714 and 736, respectively, or in any practical combination thereof. The memory modules 716 and 734 may be realized as RAM memory, flash memory, ROM memory, EPROM memory, EEPROM memory, registers, a hard disk, a removable disk, a CD-ROM, or any other form of storage medium known in the art. In this regard, memory modules 716 and 734 may be coupled to the processor modules 714 and 736, respectively, such that the processors modules 714 and 736 can read information from, and write information to, memory modules 716 and 734, respectively. The memory modules 716 and 734 may also be integrated into their respective processor modules 714 and 736. In some embodiments, the memory modules 716 and 734 may each include a cache memory for storing temporary variables or other intermediate information during execution of instructions to be executed by processor modules 714 and 736, respectively. Memory modules 716 and 734 may also each include non-volatile memory for storing instructions to be executed by the processor modules 714 and 736, respectively.

The network communication module 718 generally represents the hardware, software, firmware, processing logic, and/or other components of the BS 702 that enable bi-directional communication between the transceiver 710 and other network components and communication nodes in communication with the BS 702. For example, the network communication module 718 may be configured to support internet or WiMAX traffic. In a deployment, without limitation, the network communication module 718 provides an 802.3 Ethernet interface such that the transceiver 710 can communicate with a conventional Ethernet based computer network. In this manner, the network communication module 718 may include a physical interface for connection to the computer network (e.g., Mobile Switching Center (MSC)). In some embodiments, the network communication module 718 includes a fiber transport connection configured to connect the BS 702 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
receiving, by a wireless communication device from a base station, at least one of (1) first scheduling indicators and (2) second scheduling indicators, wherein each of the first scheduling indicators schedules a transmission, and each of the second scheduling indicators schedules two or more transmissions;
generating, by the wireless communication device, at least one of a first sub-codebook and a second sub-codebook, wherein
the first sub-codebook comprising one or more first feedback bits indicative of reception status of the transmission scheduled by each of the first scheduling indicators; and
the second sub-codebook comprising second feedback bits indicative of reception status of the two or more transmissions scheduled by each of the second scheduling indicators; and
generating, by the wireless communication device, a codebook by combining the first sub-codebook and the second sub-codebook.

2. The wireless communication method of claim 1, wherein
each of the first scheduling indicators comprises a first index identifying a bit in the first sub-codebook that corresponds to the reception status of the transmission scheduled by each of the first scheduling indicators;
each of the second scheduling indicators comprises a second index identifying bits in the second sub-codebook that corresponds to the reception status of the two or more transmissions scheduled by each of the second scheduling indicators; and
the first indexes of the first scheduling indicators are counted independently from the second indexes of the second scheduling indicators.

3. The wireless communication method of claim 2, wherein
each of the first scheduling indicators and the second scheduling indicators is in Downlink Control Information (DCI);
the transmission is a Physical Downlink Shared Channel (PDSCH) with which the wireless communication device receives downlink data from the base station; and
each of the first indexes and the second indexes is a Downlink Assignment Index (DAI).

4. The wireless communication method of claim 3, wherein
the DAI in each of the second scheduling indicators comprises a Counter DAI (C-DAI) and a Total DAI (T-DAI); and
each count of the C-DAI or the T-DAI corresponds to a number of bits in the second sub-codebook, the number of bits is based on a number of the two or more transmissions scheduled by each of the second scheduling indicators.

5. The wireless communication method of claim 4, wherein
the C-DAI for each of the second scheduling indicators is determined based on a carrier index of each of the one of the two or more transmissions; and
the second feedback bits are arranged according to the C-DAI for each of the second scheduling indicators.

6. The wireless communication method of claim 5, wherein
the one of the two or more transmissions is the transmission on a carrier with a lower carrier index than any other one of the two or more transmissions; or
the one of the two or more transmissions is the transmission on a carrier with a higher carrier index than any other one of the two or more transmissions.

7. The wireless communication method of claim 4, wherein
the C-DAI for each of the second scheduling indicators is determined based on a carrier index of each of the second scheduling indicators; and
the second feedback bits are arranged according to the C-DAI for each of the second scheduling indicators.

8. The wireless communication method of claim 1, wherein the second feedback bits corresponding to the two or more transmissions scheduled by the second scheduling indicator are continuous in the codebook.

9. The wireless communication method of claim 1, wherein
the first sub-codebook comprises at least one of two first sub-codebooks, a first one of the first sub-codebooks comprising feedback bits corresponding to a first type of transmission scheduled by a first one of the first scheduling indicators, the first type comprises Code Block Group (CBG), and a second one of the first sub-codebooks comprising feedback bits corresponding to a second type of transmission scheduled by a second one of the first scheduling indicators, the second type comprises Transmission Block (TB); and
the second sub-codebook comprises at least one of two second sub-codebooks, a first one of the second sub-codebooks comprising feedback bits corresponding to the first type of transmission scheduled by a first one of the second scheduling indicators, and a second one of the second sub-codebooks comprising feedback bits corresponding to the second type of transmission scheduled by a second one of the second scheduling indicators.

10. The wireless communication method of claim 9, wherein generating the codebook comprises combining the first sub-codebook and the second sub-codebook by bit cascading the first sub-codebooks and the second sub-codebooks according to the first type of transmission, the second type of transmission, the first scheduling indicators, and the second scheduling indicators.

11. The wireless communication method of claim 1, wherein
the first sub-codebook comprises at least one of two first sub-codebooks, a first one of the first sub-codebooks comprising feedback bits corresponding to a first type of transmission scheduled by a first one of the first scheduling indicators, the first type comprises Code Block Group (CBG), and a second one of the first sub-codebooks comprising feedback bits corresponding to a second type of transmission scheduled by a second one of the first scheduling indicators, the second type comprises Transmission Block (TB); and
the second sub-codebook comprises at least one of three second sub-codebooks, a first one of the second sub-codebooks comprising feedback bits corresponding to the first type of transmission scheduled by a first one of the second scheduling indicators, a second one of the second sub-codebooks comprising feedback bits corresponding to the second type of transmission scheduled by a second one of the second scheduling indicators, and a third one of the second sub-codebooks comprising feedback bits corresponding to the first type and the second type of transmission scheduled by a third one of the second scheduling indicators.

12. The wireless communication method of claim 11, wherein generating the codebook comprises combining the first sub-codebook and the second sub-codebook by bit cascading the first sub-codebooks and the second sub-codebooks according to the first type of transmission, the second type of transmission, the first scheduling indicators, and the second scheduling indicators.

13. A wireless communication device, comprising:
at least one processor configured to:
receive, via a receiver from a base station, at least one of (1) first scheduling indicators and (2) second scheduling indicators, wherein each of the first scheduling indicators schedules a transmission, and each of the second scheduling indicators schedules two or more transmissions;
generate at least one of a first sub-codebook and a second sub-codebook, wherein
the first sub-codebook comprising one or more first feedback bits indicative of reception status of the transmission scheduled by each of the first scheduling indicators; and
the second sub-codebook comprising second feedback bits indicative of reception status of the two or more transmissions scheduled by each of the second scheduling indicators; and
generate a codebook by combining the first sub-codebook and the second sub-codebook.

14. A base station, comprising:
at least one processor configured to:
transmit, via a transceiver to a wireless communication device, at least one of (1) first scheduling indicators and (2) second scheduling indicators, wherein each of the first scheduling indicators schedules a transmission, and each of the second scheduling indicators schedules two or more transmissions;
receive, via the transceiver from the wireless communication device, a codebook generated based on at least one of a first sub-codebook and a second sub-codebook, wherein
the first sub-codebook comprising first feedback bits indicative of reception status of the transmission scheduled by each of the first scheduling indicators; and
the second sub-codebook comprising second feedback bits indicative of reception status of the two or more transmissions scheduled by each of the second scheduling indicators; and
determine, based on the codebook, the reception status of the transmission scheduled by each of the first scheduling indicators and the reception status of the two or more transmissions scheduled by each of the second scheduling indicators.

15. A wireless communication method, comprising:
transmitting, by a base station to a wireless communication device, at least one of (1) first scheduling indicators and (2) second scheduling indicators, wherein each of the first scheduling indicators schedules a transmission, and each of the second scheduling indicators schedules two or more transmissions;
receiving, by the base station from the wireless communication device, a codebook generated based on at least one of a first sub-codebook and a second sub-codebook, wherein
the first sub-codebook comprising first feedback bits indicative of reception status of the transmission scheduled by each of the first scheduling indicators; and
the second sub-codebook comprising second feedback bits indicative of reception status of the two or more transmissions scheduled by each of the second scheduling indicators; and
determining, by the base station based on the codebook, the reception status of the transmission scheduled by each of the first scheduling indicators and the reception status of the two or more transmissions scheduled by each of the second scheduling indicators.

16. The wireless communication method of claim 15, wherein
each of the first scheduling indicators comprises a first index identifying a bit in the first sub-codebook that corresponds to the reception status of the transmission scheduled by each of the first scheduling indicators;
each of the second scheduling indicators comprises a second index identifying bits in the second sub-codebook that corresponds to the reception status of the two or more transmissions scheduled by each of the second scheduling indicators; and
the first indexes of the first scheduling indicators are counted independently from the second indexes of the second scheduling indicators.

17. The wireless communication method of claim 16, wherein
each of the first scheduling indicators and the second scheduling indicators is in Downlink Control Information (DCI);
the transmission is a Physical Downlink Shared Channel (PDSCH) with which the wireless communication device receives downlink data from the base station; and
each of the first indexes and the second indexes is a Downlink Assignment Index (DAI).

18. The wireless communication method of claim 17, wherein
the DAI in each of the second scheduling indicators comprises a Counter DAI (C-DAI) and a Total DAI (T-DAI); and
each count of the C-DAI or the T-DAI corresponds to a number of bits in the second sub-codebook, the number of bits is based on a number of the two or more transmissions scheduled by each of the second scheduling indicators.

19. The wireless communication method of claim 18, wherein
the C-DAI for each of the second scheduling indicators is determined based on a carrier index of each of the one of the two or more transmissions; and
the second feedback bits are arranged according to the C-DAI for each of the second scheduling indicators.

20. The wireless communication method of claim 19, wherein
the one of the two or more transmissions is the transmission on a carrier with a lower carrier index than any other one of the two or more transmissions; or
the one of the two or more transmissions is the transmission on a carrier with a higher carrier index than any other one of the two or more transmissions.

* * * * *